United States Patent [19]

Murata et al.

[11] 3,961,374

[45] June 1, 1976

[54] STATIC MAGNETIC ERASE HEAD

[75] Inventors: Nobuyuki Murata, Yokohama; Makoto Saito, Omiya, both of Japan

[73] Assignee: Sony Corporation, Tokyo, Japan

[22] Filed: Sept. 27, 1974

[21] Appl. No.: 509,946

[30] Foreign Application Priority Data
Oct. 2, 1973  Japan.............................. 48-110867

[52] U.S. Cl. ............................................ 360/118
[51] Int. Cl.²........................................ G11B 5/12
[58] Field of Search............................. 360/118, 66

[56] References Cited
UNITED STATES PATENTS

| | | |
|---|---|---|
| 2,546,927 | 3/1951 | Howell................................ 360/118 |
| 2,594,934 | 4/1952 | Kornei................................ 360/118 |
| 2,908,768 | 10/1959 | Steinegger......................... 360/118 |
| 3,772,471 | 11/1973 | Imai et al............................ 360/118 |

Primary Examiner—Robert S. Tupper
Attorney, Agent, or Firm—Hill, Gross, Simpson, Van Santen, Steadman, Chiara & Simpson

[57] ABSTRACT

A magnetic erasing head for magnetic recording apparatus using a static magnetic field. The erasing head includes at least three magnetic poles all of which are arranged to scan the same recorded track on the tape. The first and third poles have the same polarity while the second pole has opposite magnetic polarity. The first pole is arranged to engage the full width of the track and magnetizes it with one polarity. The second pole faces the upper half of the track and magnetizes it with the opposite polarity. The third pole engages the lower half of the track and magnetizes it with the same polarity as the first pole. After passing by these three poles, substantially one-half of the recording track is magnetized with one polarity and the other half of the track is magnetized with the other polarity so that distortion of output signals is maintained small or eliminated for various magnetic tapes having different coercive force values.

9 Claims, 19 Drawing Figures

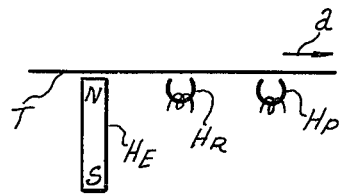
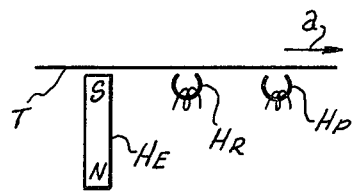
Fig. 1  Fig. 2
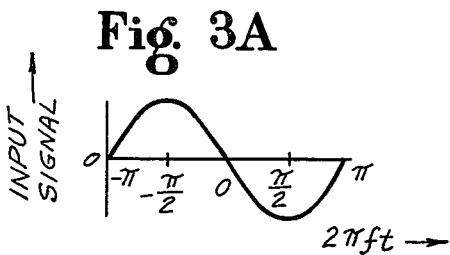
Fig. 3A
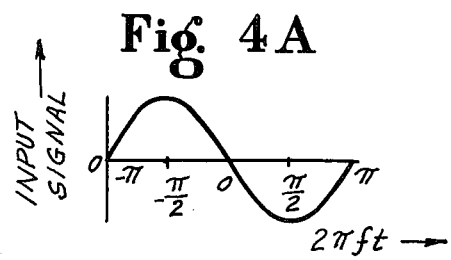
Fig. 4A
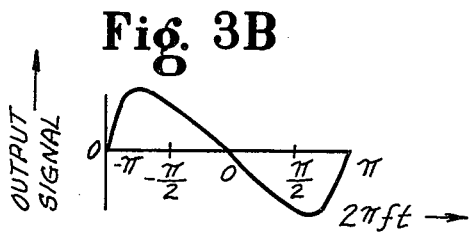
Fig. 3B
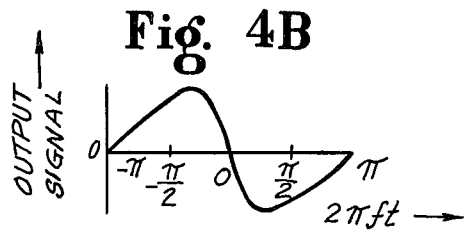
Fig. 4B
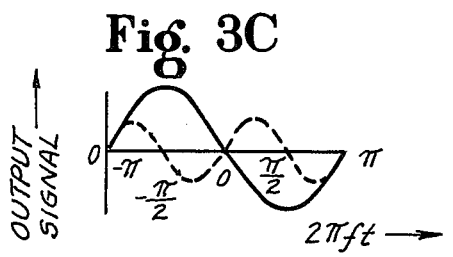
Fig. 3C
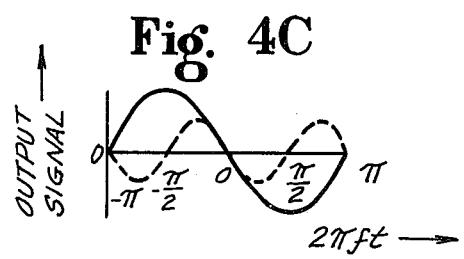
Fig. 4C
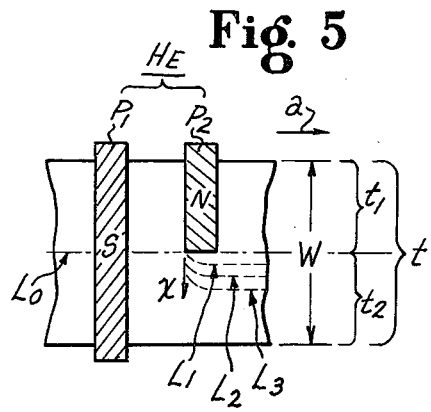
Fig. 5
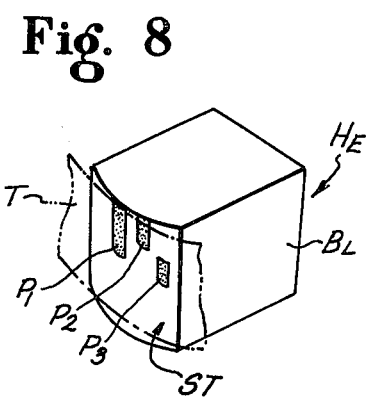
Fig. 8

STATIC MAGNETIC ERASE HEAD

BACKGROUND OF THE INVENTION

1. Field of the Invention

This invention is in the field of magnetic erasing heads, and particularly involves the use of a plurality of heads which provide static magnetic fields through which the tape or other magnetic medium passes in the erasing process.

2. DESCRIPTION OF THE PRIOR ART

There are two types of methods for erasing residual magnetization for magnetic recording media such as a magnetic tape. One is alternating current demagnetization, and the other is static magnet erasing. In alternating current demagnetization, an alternating current flows through a coil wound on the magnetic erasing head. When the magnetic medium passes over a gap on this erasing head, it is magnetized up to its magnetic saturated condition. As it passes away from the gap, it is re-magnetized reversely and repeatedly. Eventually, the magnitude of magnetization reduces to a value approximating zero. This method is widely used in the field of magnetic recording and reproducing apparatus because the residual magnetization is completely erased. However, there are some difficulties with it because when high coercive force magnetic materials are used, the electric power consumed for the erasing head becomes high. Such a high power loss causes the core of the erasing head to become easily saturated with the result that the erasing effect is decreased.

The static magnetic erasing method involves the use of a strong static magnetic field provided by a permanent magnet or a coil wound on a core. The recording medium is magnetized from the state of residual magnetization to the saturated state. This method can be used for a relatively small magnetic recording and reproducing apparatus such as a tape recorder operated by a battery because of its simplicity. The difficulty of this method is that there is a tendency to distortion of the output signal at the reproducing stage.

An improvement of the static magnetic erasing method was proposed in the prior art. A permanent magnet was used in which the magnetized polarity was changed repeatedly and the magnitude was decreased toward zero along the scanning direction of the magnetic tape. This improved erasing head has an advantage similar to that of the alternating current method, but has its own disadvantage. The erasing head requires a large number of magnetic poles and it causes the length of the erasing head to be rather long. As a result, it is not suitable for use in a small magnetic recording apparatus.

SUMMARY OF THE INVENTION

The present invention provides a magnetic erasing head which includes at least three magnetic poles to provide static magnetic fields on the recording track of the magnetic recording medium. In the preferred embodiment of the invention, the first pole is arranged to engage the full width of the recording track and provides a a static magnetic field of sufficient intensity to saturate the residual magnetization of the recording medium. The second pole engages one-half of the recording track and provides a static magnetic field of higher intensity than the maximum coercive force of the various magnetic recording media which would come in contact with it. The second pole has a polarity opposite to the polarity of the first pole. The third pole engages the other half of the recording track and provides a static magnetic field of an intensity higher than the minimum coercive force of the particular magnetic recording media which are to be used. The third pole magnetizes the recording track with the same polarity as the first pole. The position of the inner edges of the second and third poles is arranged so that distortion of output signals reproduced by a reproducing head from each magnetic recording medium, regardless of its coercive force, is made small.

BRIEF DESCRIPTION OF THE DRAWING

FIGS. 1 to 7, inclusive, are drawings which are used to illustrate the principles of the present invention;

FIGS. 8 and 9 illustrate a first embodiment of the invention;

DESCRIPTION OF THE PREFERRED EMBODIMENTS

The principles of the static erasing head of the present invention may be explained as follows. The erasing head may be divided into two portions. These two portions are shown in FIGS. 1 and 2.

With regard to the first portion, shown in FIG. 1, three heads are arranged in the order of an erasing head $H_E$, one portion of which is shown, a recording head $H_R$ and a playback or reproducing head $H_p$, extending from left to right. These three heads are arranged to engage a traveling magnetic recording tape T. The erasing head $H_E$ is shown in a simplified manner as a bar magnet having a north polarity facing the tape.

The second portion of the erasing head shown in FIG. 2 as a south pole engaging the tape. Otherwise, the arrangement is the same as in FIG. 1. In both FIGS. 1 and 2, the two magnetic poles of the erasing head $H_E$ provides sufficient magnitude of magnetic field to saturate the residual magnetization, the previously recorded signal which is to be erased, of the recording tape.

The magnetic tape T is moved along the direction indicated by the arrow a and passes first by the erasing head $H_E$ then the recording head $H_R$ and finally the reproducing head $H_p$. A sine wave signal, illustrated in FIGS. 3A and 4A is supplied to the recording head $H_R$ of FIGS. 1 and 2, respectively, to record the signal on a magnetic recording medium. Subsequently, the recorded signal is reproduced by the reproducing head $H_P$ of FIGS. 1 and 2. If the output signals are defined individually, they have distortions which appear as illustrated in FIGS. 3B and 4B. We have found that the distorted output signal is caused by a superposition of sine waves, i.e., a first wave having the same frequency as the input signal illustrated by a solid line in FIGS. 3C and 4C, and a second wave consisting of the second harmonic illustrated by a dotted line in FIGS. 3C and 4C. The phase difference between the second harmonic waves of FIGS. 1 and 2 is 180°. Consequently, the output signals illustrated in FIGS. 3B and 4B are distorted and the distortions are different from each other.

In the present invention, two portions of the erasing head $H_E$, shown in FIGS. 1 and 2, are formed in a common erasing head or otherwise adjacent each other and engage the same recording track. The recording head $H_R$ and the reproducing head $H_P$, of course, extend over the full width of the track. In the reproducing head, both output signals shown in FIGS. 3B and 4B are superposed and both second harmonic waves shown by the dotted lines cancel each other. As a result, an output signal without distortion is obtained.

Figure 6A:
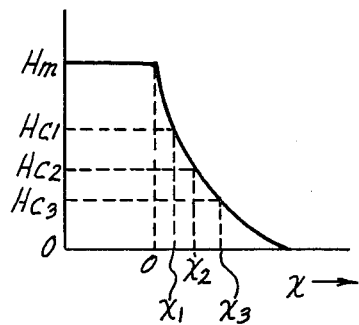
Figure 6B:
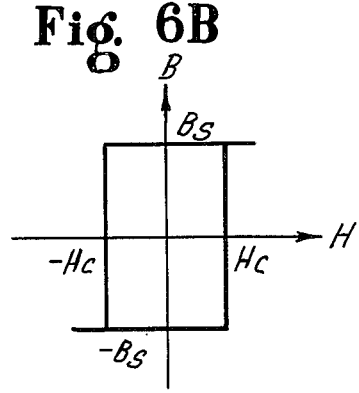
Figure 7:
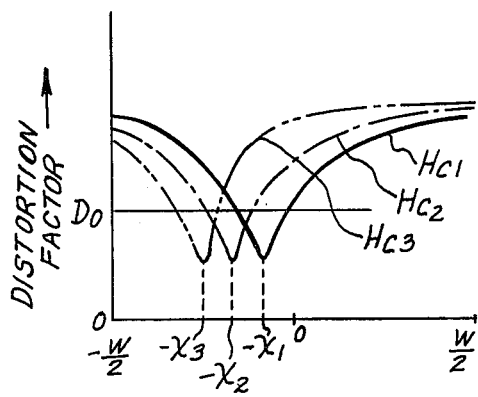

Considering next FIGS. 5 to 7, the recording track $t$ having a width W has been divided into two parts, subtrack $t_1$ and subtrack $t_2$. An erasing head $H_E$ comprises a first pole $P_1$ and a second pole $P_2$. The subtrack $t_1$ is magnetized eventually by the second pole $P_2$ and the subtrack $t_2$ is magnetized by the first pole $P_1$. After signals are recorded on both subtracks, the signals are reproduced by a reproducing head which engages the track along its full width. The second harmonic waves reproduced from both subtracks are canceled because of the phase difference. The magnetic tape passes along the erasing head $H_E$ in the direction of the arrow $a$. The tape thereby passes by the first pole $P_1$ and then by the second pole $P_2$. The first pole $P_1$ engages the recording track over its full width and provides sufficient magnetic field to saturate the residual magnetization of the tape so after passing the first pole $P_1$ the recording track $t$ is magnetized with the polarity of the pole $P_1$. The second pole $P_2$ provides a magnetic field to the tape which is greater than the coercive force $H_C$ of the magnetic tape so that after passing the second pole $P_2$, the upper subtrack $t_1$ is eventually magnetized with the polarity of the pole $P_2$ which in the instance shown would be a north polarity.

In FIG. 6A, there is shown a distribution of magnetic field provided by the second pole $P_2$ to the magnetic tape in the direction perpendicular to the movement of the tape. The letter $x$ indicates the distance of the inner end of the second pole $P_2$ from the centerline $L_0$ of the recording track $t$. In FIG. 6B, there is shown one example of the B–H hysteresis loop of the magnetic tape. As shown in FIG. 6A, the magnetic field provided by the second pole $P_2$ decreases in accordance with increasing values of $x$. Three experiments involving magnetic tapes of different coercive force values have shown that the boundary of opposite polarities magnetized on the tape changes. In these experiments, $H_m$ is the magnetic field provided by the second pole $P_2$ and $H_{C1}$, $H_{C2}$ and $H_{C3}$ are the coercive force values of each of the three specimens of tape. The second magnetic pole $P_2$ should provide a field $H_m$ stronger than any one of the coercive forces of the tapes involved. The tapes were moved from left to right in the direction of the arrow $a$ and passed the first and second poles, $P_1$ and $P_2$. The boundary line of opposite magnetized polarities of both poles changes as indicated by $L_1$, $L_2$, and $L_3$ in accordance with the different coercice force values, $H_{C1}$, $H_{C2}$, and $H_{C3}$, respectively. When the coercive force is small, the boundary line moves toward the lower side of the recording track t. This relationship is shown clearly in FIG. 6.

In another experiment, the position of the pole $P_2$ was changed in the direction perpendicular to the tape movement. It was observed that the distortion factor is related to the shifted position of the pole $P_2$ as shown in FIG. 7. In that figure, the abscissa indicate the distance $x$ which is measured from the inner edge of the second pole piece $P_2$ to the centerline $L_0$ and the ordinates indicate the distortion factor of the output signal. The curves $H_{C1}$, $H_{C2}$, and $H_{C3}$ indicate the distortion factors of output signals reproduced from magnetic tapes having coercive force values of $H_{C1}$, $H_{C2}$, and $H_{C3}$, respectively. The distortion factor is at a minimum when the positions of the inner edge of each of the second pole $P_2$ are $-x_1$, $-x_2$, and $-x_3$ as shown in FIG. 7. Thus, if the position of the second pole $P_2$ is selected properly, the distortion factor of the output signal is made lower than the maximum allowable distortion factor $D_0$ for a pair of magnetic tapes having coercive forces of $H_{C1}$ and $H_{C2}$, or another pair having coercive force values $H_{C2}$ and $H_{C3}$. But for the magnetic tapes having coercive force values of $H_{C1}$ and $H_{C3}$, the distortion factor of the output signal reproduced from both tapes cannot be made lower than the maximum allowable distortion factor $D_0$ because there is no cross-over point of the curve $H_{C1}$ and $H_{C3}$ in the region below $D_0$. From these considerations, the shorter the distance between the centerline $L_0$ and the boundary between differently magnetized regions is, the smaller the distortion factor of the output signal is. The closer the boundary line of the differently magnetized regions is, the easier it is to reduce the distortion factor of the output signal reproduced from both magnetic tapes lower than the allowable distortion factor $D_0$.

Figure 9:
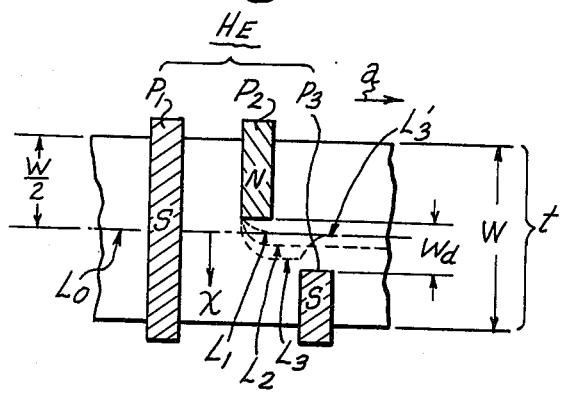

FIGS. 8 and 9 show a preferred embodiment of the present invention. The erasing head $H_E$ comprises three magnetic poles $P_1$, $P_2$, and $P_3$, on a cylindrical surface ST. These poles are formed by selective magnetization of a magnetizable material such as barium ferrite. The method of selective magnetization is well known in the prior art. The two poles $P_1$ and $P_3$ have the same magnetic polarity, for example, being south poles. The intermediate pole $P_2$ has the opposite polarity as shown in FIG. 9. The opposite poles of each of the poles are embedded in the head block and are not shown in the drawings. Another method of providing such poles would be to use three bar-type permanent magnets embedded in a non-magnetizable head block.

Magnetic poles $P_1$, $P_2$ and $P_3$ have substantially rectangular shape and are arranged against the recording track $t$ as follows. In FIG. 9, the recording track $t$ which has an effective width W is shown with a centerline $L_0$. The recording tape passes first pole $P_1$, the second pole $P_2$, and then the third pole $P_3$ in the direction of the arrow a.

The first magnetic pole $P_1$ has a length perpendicular to the direction of movement which is the same as or longer than the width of the recording track $t$. It provides a sufficient magnitude of static magnetic field to saturate magnetically the residual magnetization of the recording tape.

The second magnetic pole $P_2$ is disposed to engage most of the upper half of the recording track t. The upper edge of the pole $P_2$ is located above the top end of the recording track, while the lower or inner end of the pole $P_2$ is above the centerline $L_0$. This pole provides a static magnetic field stronger than the maximum coercive force values of the magnetic tapes which may be used in the tape recorder.

The third magnetic pole $P_3$ is disposed to engage the lower half of the recording track $t$. The upper edge of the pole $P_3$ is below the centerline $L_0$ and this pole provides a static magnetic field stronger than the coercive force of the magnetic tapes which are to be used.

The magnetic tape is magnetized partially with the polarity of the first pole $P_1$ and the third pole $P_3$, and partially with a second polarity by the second pole $P_2$. The first and second polarities have components in directions opposite to each other along a direction parallel to the tape movement direction. The three magnetic poles, $P_1$, $P_2$ and $P_3$ are arranged so that the boundary line $L_{3'}$ of the opposite polarities magnetized in the track $t$ is as close as possible to the centerline $L_0$ of the track $t$ after the tape passes all of the magnetic poles of the erasing head $H_E$. By adding the third pole $P_3$ of the present invention to the other poles $P_1$ and $P_2$, the distortion factor of the output signal is reduced even in the case of using different kinds of magnetic tapes of different coercive force values in the same recording apparatus.

The reason for the reduction of the distortion is as follows. The erasing head is used to erase the residual magnetization of different kinds of magnetic tapes having different coercive forces $H_{C1}$, $H_{C2}$, and $H_{C3}$, respectively. The coercive force $H_{C1}$ is assumed to be greater than $H_{C2}$ which in turn is greater than $H_{C3}$. The first magnetic pole $P_1$ provides sufficient magnetic field to the magnetic tape strong enough to saturate magnetically the residual magnetization of every magnetic tape. Consequently, after passing the first pole $P_1$, the magnetic tape is magnetized with its polarity.

Figure 10:
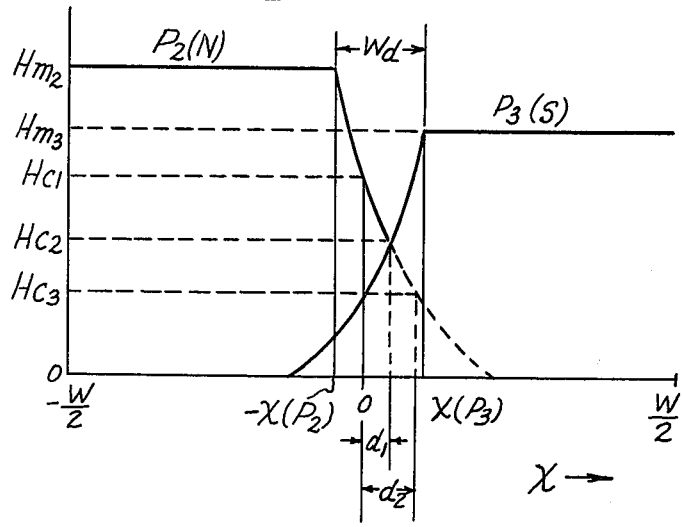
FIG. 10 is a graph used to explain the operation of the embodiment of FIGS. 8 and 9.

The second pole $P_2$ is provided with a static magnetic field $H_{m2}$ which is stronger than the maximum coercive force of the highest coercive force $H_{C1}$ of the magnetic tapes. This relationship is shown in FIG. 10. The second pole $P_2$ engages the first track $t_1$ with an upper edge above the top of the track $t$ and its lower edge above the centerline $L_0$ of the track $t$. After passing the second pole $P_2$, the magnetic tape is partially magnetized and reversed in magnetization by the second polarity of the pole $P_2$ when the magnetic field provided by the second pole $P_2$ is stronger than the coercive force value of the magnetic tape. Hence, the recording track can be considered as divided into two regions of different polarity. Between the two regions there is a boundary as shown by dotted lines $L_1$, $L_2$, and $L_3$ in accordance with the coercive force values of the magnetic tapes $H_{C1}$, $H_{C2}$ and $H_{C3}$, respectively. The position of the pole $P_2$ is selected so that the boundary line $L_1$ is substantially overlapping with the centerline $L_0$.

The third pole $P_3$ provides a static magnetic field $H_{m3}$ which is stronger than the coercive force of the magnetic tape having the lowest coercive force. In other words, the magnetic field $H_{m3}$ is greater than $H_{C3}$. As shown in FIG. 10, it may also be greater than the coercive force values of the other two tapes.

The third pole $P_3$ has an upper edge below the centerline $L_0$ of the track $t$. After passing the pole $P_3$, the magnetic tape is magnetized with the original polarity, wherever the magnetic field provided by the third pole $P_3$ is stronger than the coercive force of the magnetic tape. The boundary of the magnetic tape having the minimum coercive force value $H_{C3}$ is moved from $L_3$ to $L_{3'}$ by the by the existence of the third pole $P_3$ of the present invention. As seen in FIG. 9, the third pole $P_3$ is positioned so that the final boundary line $L_{3'}$ overlaps the centerline $L_0$ of the track $t$. In FIGS. 9 and 10, the value $W_d$ is the distance between the two poles $P_2$ and $P_3$ along the width of the track $t$. The value $d_1$ is the distance between the two boundaries $L_1$ which is at $L_0$ and $L_2$. The distance $d_2$ is the distance between the two boundaries $L_1$ and $L_3$.

As a result, the distortion of output signals reproduced by the reproducing head becomes minimum for the magnetic tapes having coercive force values $H_{C1}$ and $H_{C2}$. When the position of the second pole $P_2$ is such as to reduce the distortion of output signals for magnetic tapes having coercive force values $H_{C1}$ and $H_{C2}$ below the value $D_0$ and the position of the third pole $P_3$ is such that the boundary line $L_{3'}$ overlaps the centerline $L_0$, the distortion factor can be reduced lower than $D_0$ for all types having coercive force values $H_{C1}$, $H_{C2}$, and $H_{C3}$.

In the magnetic erasing head, illustrated in FIGS. 8 and 9, the lower edge of the pole $P_3$ is lower than the bottom of the recording track $t$, but this is not a necessary condition.

Figure 11:
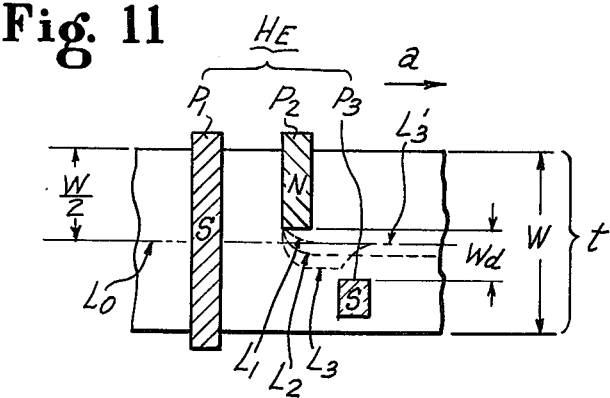
FIG. 11 is a drawing of the second embodiment of the invention.

In the embodiment illustrated in FIG. 11, the lower edge of the pole $P_3$ is disposed above the bottom of the recording track $t$, and even in this case, the erasing head operates the same as in the case of the head shown in FIG. 9. The most important condition regarding the position of the pole $P_3$ is the inner or upper edge.

Figure 12:
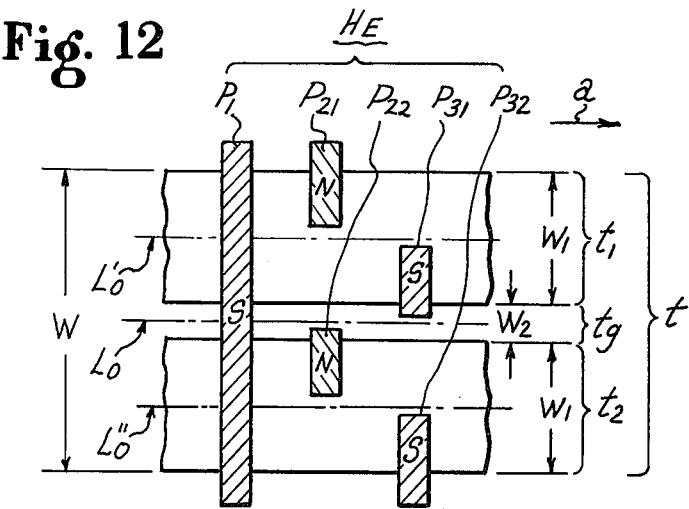
FIG. 12 is a drawing of a third embodiment of the invention.

A magnetic recording medium may be used both as single track recording or double track recording. Referring to FIG. 12 there is shown a magnetic erasing head $H_E$ which can be used for double track recording. The full width of the track $t$ is used in single track recording and the full track $t$ is divided, for double track recording, into two semi-recording tracks $t_1$ and $t_2$ separated by a guard band $t_g$. The widths of the tracks $t_1$ and $t_2$ are $W_1$, and the width of the band $t_g$ is $W_2$.

There are five magnetic poles in the structure shown in FIG. 12, consisting of a first pole $P_1$, two second poles $P_{21}$ and $P_{22}$, and two third poles $P_{31}$ and $P_{32}$. The first pole $P_1$ is arranged to engage the recording track $t$ along its full width and has a length in a direction perpendicular to tape movement which is longer than the width W of the recording track $t$.

One of the second poles $P_{21}$ engages the upper half of the upper recording track $t_1$. The upper edge of the pole $P_{21}$ is above the top of the track $t_1$ and the lower edge of the pole $P_{21}$ is higher than the centerline $L_{0'}$ of the upper track $t_1$. Another second pole $P_{22}$ engages the upper half of the lower track $t_2$. The upper edge of the pole $P_{22}$ is below the centerline $L_0$ of the track $t$ and higher than the top of the recording track $t_2$. The lower edge of the pole $P_{22}$ is higher than the centerline $L_{0''}$ of the lower track $t_2$.

Figure 13:
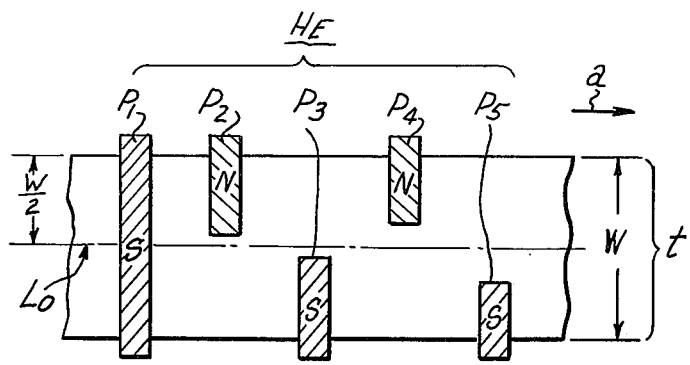
FIG. 13 is a drawing of a fourth embodiment of the invention.

One of the third poles $P_{31}$ engages the lower half of the upper recording track $t_1$. The upper edge of the pole $P_{31}$ is lower than the centerline $L_{0'}$ of the upper track $t_1$. Another third pole $P_{32}$ engages the lower half of the lower recording track $t_2$. The upper edge of the pole $P_{32}$ is lower than the centerline $L_{0''}$ of the lower track $t_2$. The first pole $P_1$ provides sufficient magnetic field to the magnetic recording medium to saturate magnetically the residual magnetization of the magnetic tape. The second poles $P_{21}$, $P_{22}$ provide a magnetic field stronger than the maximum coercive force $H_C$ of the magnetic tapes. The third poles $P_{31}$ and $P_{32}$ provide a magnetic field stronger than the minimum coercive force of the magnetic tapes. The inner edge of the second and third poles are positioned to reduce the distortion of the output signal reproduced by each reproducing head. A fourth embodiment is shown in FIG. 13, wherein the erasing head $H_E$ is composed of five magnetic poles $P_1$ to $P_5$ which contact the tape as it moves in the direction shown by arrow $a$. This embodiment is suitable when different types of magnetic tapes having coercive force values which differ substantially from each other.

Figure 14:
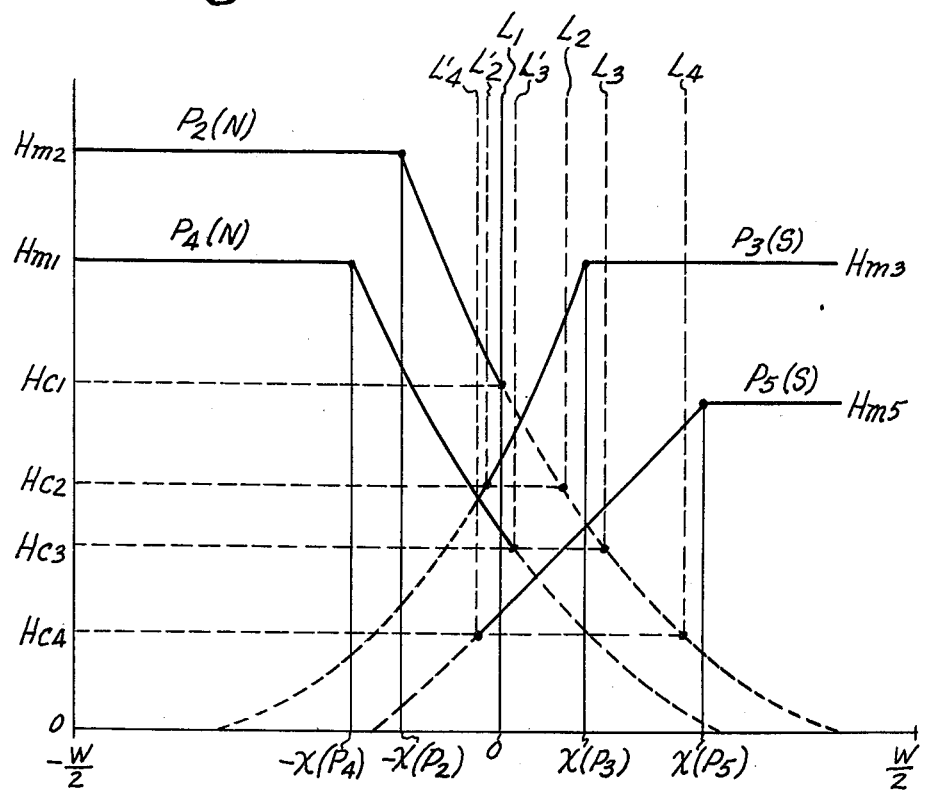
FIG. 14 is a graph used to explain the fourth embodiment of the invention.

The fourth and fifth poles $P_4$ and $P_5$ are added to the structure shown in FIG. 9. The first pole $P_1$ is the same as the pole $P_1$ in FIG. 9. The second and fourth poles $P_2$ and $P_4$ have a polarity opposite to that of $P_1$ located in the upper half of the track $t$. The third and fifth poles $P_3$ and $P_5$ have the polarity of $P_1$ and are arranged to engage the lower half of the track $t$. The position of the fourth pole $P_4$ is similar to that of the second pole $P_2$. The position of the fifth pole $P_5$ is similar to that of the third pole $P_3$ so that the magnetized boundary of opposite polarity overlaps the centerline $L_0$ of the track. In the embodiment of FIG. 13, the second pole $P_2$ and the fourth pole $P_4$ provide a magnetic field which is stronger than any coercive force of the various magnetic tapes. The third pole $P_3$ and the fifth pole $P_5$ provide a magnetic field $H_{m3}$ and $H_{m5}$ which is greater than the minimum coercive force in the various tapes. From the diagram shown in FIG. 14, the movement of the boundaries may be explained with respect to different tapes having different coercive force values. The boundary of the tape of the highest coercive force $H_{C1}$, is at the point where $x = 0$, where $x$ is the distance from the centerline $L_0$ of the track $t$. The boundary of the other tapes is correspondingly moved by the positioning of the poles as described in conjunction with the preceding figures.

The erasing head of the present invention is not limited to one which is formed in the manner shown in FIG. 8 since other pole forming methods may be used. For example, the erasing head may consist of a plurality of bar-type permanent magnets embedded in a non-magnetizable body such as brass. One end of each of the bar magnets is a cylindrical surface of the head block and the cylindrical surface engages the magnetic recording medium. The magnetic poles of the erasing head may also be formed by ring core heads provided with a coil which is applied with direct current. The first, second or third poles of the present invention may not only be north or south poles, but may consist of a head gap of a ring core producing magnetic fluxes in opposite directions. In addition, other shapes of magnetic poles may be used such as those having round edges.

It will be understood that various modifications can be made to the described embodiments without departing from the scope of the present invention.

We claim as our invention:

1. A magnetic erasing head comprising at least three magnetic poles arranged to engage the recording track of a moving magnetic recording medium, said first magnetic pole extending perpendicular to the direction of such movement and engaging at least the full width of said recording track and providing a static magnetic field sufficient to magnetize said track with a first polarity to a magnetically saturated state, a second magnetic pole engaging substantially one-half of said recording track with one edge of said second pole extending beyond one edge of the recording track, the other edge of said pole being spaced from the centerline of the recording track on the same side as said one edge of the recording track, said second pole providing a static magnetic recording field which is greater than the maximum coercive force of the magnetic recording medium, said second pole having a polarity opposite to that of the first pole, said third magnetic pole engaging the other half of said recording track below said centerline and providing a static magnetic field to said magnetic recording medium which is greater than the minimum coercive force of the magnetic recording medium, said third pole having a polarity the same as the first pole, said first, second and third magnetic poles being spaced in the direction of such movement with said second pole between said first and third poles.

2. A magnetic erasing head as claimed in claim 1, wherein said magnetic poles are disposed on the surface of a head block.

3. A magnetic erasing head as claimed in claim 1, wherein said magnetic poles are located on the surface of a head block composed of magnetizable material by means of selective magnetization of said block.

4. A magnetic erasing head as claimed in claim 3, wherein said magnetizable material is barium ferrite.

5. A magnetic erasing head as claimed in claim 1, wherein said magnetic poles are edges of permanent magnets.

6. A magnetic erasing head as claimed in claim 1, wherein said magnetic poles are disposed on the surface of a head block, and each magnetic pole is one edge of a permanent magnet confined within non-magnetizable material.

7. A magnetic erasing head as claimed in claim 6, wherein said non-magnetizable material is brass.

8. A magnetic erasing head as claimed in claim 1, wherein said magnetic poles are edges of electromagnets.

9. A magnetic erasing head as claimed in claim 1, wherein said magnetic poles consist of ring-shaped cores having coils thereon to which direct current is supplied.

* * * * *